United States Patent
Haruna et al.

(10) Patent No.: US 11,894,784 B2
(45) Date of Patent: Feb. 6, 2024

(54) POWER CONVERSION DEVICE, MOTOR DRIVE SYSTEM, AND DISCONNECTION DETECTION METHOD FOR SIGNAL TRANSMISSION CABLE

(71) Applicant: Mitsubishi Electric Corporation, Tokyo (JP)

(72) Inventors: Nobuyuki Haruna, Tokyo (JP); Keita Takahashi, Tokyo (JP); Yusuke Yamakaji, Tokyo (JP); Masaomi Washino, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 18/035,296

(22) PCT Filed: Dec. 3, 2020

(86) PCT No.: PCT/JP2020/045138
§ 371 (c)(1),
(2) Date: May 4, 2023

(87) PCT Pub. No.: WO2022/118450
PCT Pub. Date: Jun. 9, 2022

(65) Prior Publication Data
US 2024/0014750 A1  Jan. 11, 2024

(51) Int. Cl.
*H02M 7/539* (2006.01)
*H02P 23/14* (2006.01)
*H02P 27/08* (2006.01)

(52) U.S. Cl.
CPC ............ *H02M 7/539* (2013.01); *H02P 23/14* (2013.01); *H02P 27/08* (2013.01)

(58) Field of Classification Search
CPC .. H02P 29/024; H02P 29/0243; H02P 29/028; H02P 29/032; H02P 29/666;
(Continued)

(56) References Cited

U.S. PATENT DOCUMENTS

2004/0183499 A1   9/2004 Matsubara et al.

FOREIGN PATENT DOCUMENTS

| JP | S62-245162 A | 10/1987 |
| JP | H01-267469 A | 10/1989 |

(Continued)

OTHER PUBLICATIONS

International Search Report and Written Opinion dated Jan. 12, 2021, received for PCT Application PCT/JP2020/045138, filed on Dec. 3, 2020, 8 pages including English Translation.

*Primary Examiner* — Antony M Paul
(74) *Attorney, Agent, or Firm* — XSENSUS LLP

(57) ABSTRACT

A power conversion device includes: a power conversion circuit that outputs power to a power output terminals to which electric cables of a power cable for supplying AC power to a motor is connected; an encoder circuit that outputs encoder information on the basis of angle information input to an information input terminal and supplied from signal lines of a signal transmission cable; a control unit that outputs a control signal that controls the power conversion circuit on the basis of the encoder information supplied from the encoder circuit; a shield terminal connected to a shield of the signal transmission cable which is electrically connected to a ground line of a power cable on the motor side; and a determination unit that detects a current input to the shield terminal and flowing through the shield of the signal transmission cable, and outputs disconnection detection information for disconnection in the shield.

13 Claims, 9 Drawing Sheets

(58) Field of Classification Search
CPC ............. H02P 2201/00; H02P 2201/01; H02P 2201/03; H02P 2205/01; H02P 2207/05; H02P 2203/00; H02P 21/22; H02P 6/28; H02P 6/00; B62D 5/0487; H02H 3/105; H02H 1/0015; H02H 3/16; H02H 3/162; H02H 3/08; H02H 3/027; H02H 1/0038; H02H 1/0007; H02H 3/32; H01H 83/02
See application file for complete search history.

(56) References Cited

FOREIGN PATENT DOCUMENTS

| | | | | |
|---|---|---|---|---|
| JP | 2001-268736 | A | 9/2001 | |
| JP | 2003-180088 | A | 6/2003 | |
| JP | 2003-185694 | A | 7/2003 | |
| JP | 2004-248371 | A | 9/2004 | |
| JP | 2005-166450 | A | 6/2005 | |
| JP | 6473611 | B2 * | 2/2019 | ............. B25J 19/06 |
| JP | S473611 | B2 | 2/2019 | |

* cited by examiner

POWER CONVERSION DEVICE, MOTOR DRIVE SYSTEM, AND DISCONNECTION DETECTION METHOD FOR SIGNAL TRANSMISSION CABLE

CROSS-REFERENCE TO RELATED APPLICATION

The present application is based on PCT filing PCT/JP2020/045138, filed Dec. 3, 2020, the entire contents of which are incorporated herein by reference.

TECHNICAL FIELD

The present disclosure relates to a power conversion device, a motor drive system, and a disconnection detection method for a signal transmission cable that are capable of determining presence or absence of disconnection of a signal transmission cable including a signal line that transmits angle information of a rotation shaft of a motor and a shield.

BACKGROUND ART

To a factory robot and a factory machine tool, a power cable for supplying power to a servomotor and a signal line that transmits angle information of a rotation shaft of the motor are connected. These may be disconnected due to movement of the servomotor, and various methods for detecting disconnection of a shield of a shielded cable have been proposed in order to prevent such disconnection.

For example, as for a method for detecting disconnection of a cable of a resistance welding machine, Patent Literature 1 discloses a method for connecting a tertiary winding of a transformer between both ends of a shielded portion of a shielded cable via a relay, and detecting disconnection of the shielded portion of a shielded line by opening and closing the relay, and a method for connecting a resistor, a photocoupler, and a resistor in series between a first end of one of DC power sources connected in series and a first end of a shielded portion of a shielded line, connecting a resistor, a photocoupler, and a resistor in series between a first end of the other DC power source and a second end of the shielded portion of the shielded line, connecting a capacitor for surge current absorption to each path, and detecting disconnection of the shielded portion of the shielded line by presence or absence of a current flowing through the path.

Patent Literature 2 discloses a method for sensing disconnection of shielded layers of a pair of control cables connected to a welding robot by disposing a conduction sensing electric path for sensing presence or absence of electrical conduction between the welding robot and ends of the shielded layers.

Patent Literature 3 discloses an electric brake cable constituted by combining a power source supply line and a signal line with a disconnection sensing line.

CITATION LIST

Patent Literatures

Patent Literature 1: JP S62-245162 A
Patent Literature 2: JP 6473611 B2
Patent Literature 3: JP 2005-166450 A

SUMMARY OF INVENTION

Technical Problem

The techniques disclosed in Patent Literatures 1 and 2 have a problem that it is necessary to dispose a tertiary winding of a transformer or a DC power source, a resistor, and a photocoupler, or a conduction sensing electric path, in addition to a determination unit that determines presence or absence of disconnection of a shield of a shielded cable, and Patent Literature 3 has a problem that it is necessary to prepare a disconnection sensing line.

The present disclosure has been made to solve the above problems, and an object of the present disclosure is to obtain a power conversion device that does not need to newly add a power source, a conduction sensing electric path, or a disconnection sensing line for determining presence or absence of disconnection of a shield of a signal transmission cable, in addition to a determination unit that determines presence or absence of disconnection of the shield.

Solution to Problem

A power conversion device according to the present disclosure includes: a power conversion circuit to convert power input to a power input terminal into AC power to be supplied to a motor, and to output the converted AC power to be supplied to the motor, to a power output terminal to which an electric cable of a power cable used for supplying AC power to the motor is connected; a ground terminal to which a ground line of the power cable is connected; an encoder circuit to output encoder information, on the basis of angle information input to an information input terminal and supplied from a signal line of a signal transmission cable; a control circuit to output a control signal that controls the power conversion circuit on the basis of the encoder information supplied from the encoder circuit; a shield terminal to which a shield of the signal transmission cable is connected, the shield being electrically connected to the ground line of the power cable on a side of the motor; and determination circuitry to detect a current input to the shield terminal and flowing through the shield of the signal transmission cable, and to output disconnection detection information for disconnection in the shield of the signal transmission cable.

Advantageous Effects of Invention

According to the present disclosure, it is possible to obtain disconnection detection information for the shield of the signal transmission cable connected to the shield terminal by detecting a current flowing through the shield of the signal transmission cable.

DESCRIPTION OF EMBODIMENTS

First Embodiment

A motor drive system according to a first embodiment will be described with reference to FIGS. 1 to 7.

Figure 1:
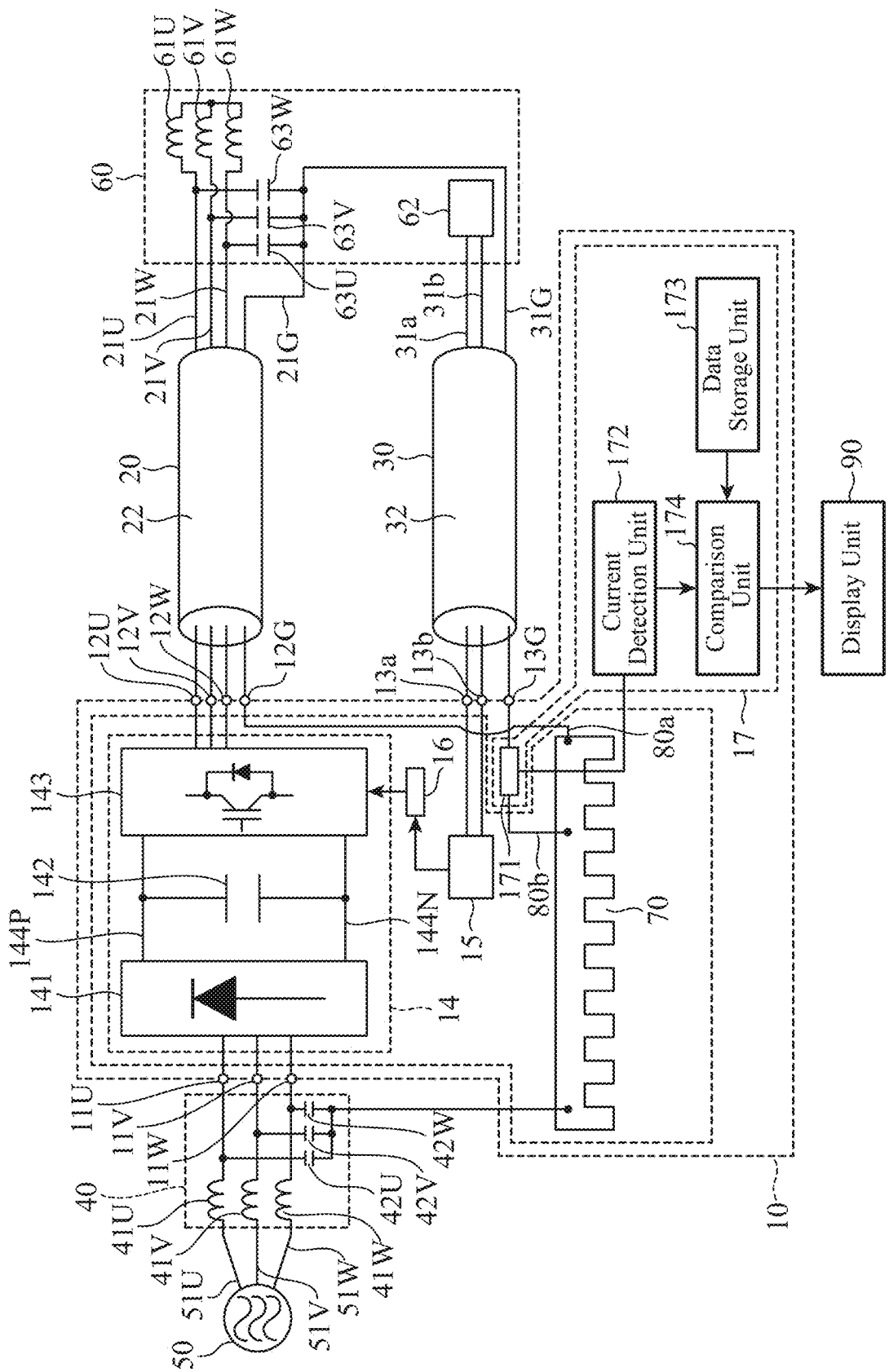
FIG. 1 is a circuit diagram illustrating a motor drive system according to a first embodiment.

As illustrated in FIG. 1, the motor drive system includes a power conversion device 10, a power cable 20, a signal transmission cable 30, and a noise filter 40.

An AC power source 50, which is a system power source, is a power source that supplies AC power of three phases consisting of a U phase, a V phase, and a W phase, and is connected to power lines 51U, 51V, and 51W of the three phases consisting of the U phase, the V phase, and the W phase.

A motor 60 is a three-phase motor, and includes a motor body in which motor windings 61U, 61V, and 61W of the three phases consisting of the U phase, the V phase, and the W phase, and a rotor (not illustrated) having a rotation shaft are included, and an encoder circuit 62 that obtains angle information of the rotation shaft in the motor body 61.

The motor 60 is a generally known servomotor.

The encoder circuit 62 is a generally known encoder circuit used for a servomotor.

The power conversion device 10 includes power input terminals 11U, 11V, 11W, power output terminals 12U, 12V, 12W, a ground terminal 12G, information input terminals 13a, 13b, a shield terminal 13G, a power conversion circuit 14, an encoder circuit 15, a control circuit 16 serving as a control unit, and a determination unit 17. The power conversion circuit 14, the encoder circuit 15, and the control circuit 16 constitute a servo amplifier. The power conversion device 10 is mounted on a circuit board (not illustrated).

The power input terminals 11U, 11V, and 11W for the three phases are connected to the corresponding power lines 51U, 51V, and 51W, respectively, via the noise filter 40.

The noise filter 40 includes common mode choke coils 41U, 41V, and 41W connected between the corresponding power lines 51U, 51V, and 51W and the corresponding power input terminals 11U, 11V, and 11W, respectively, and includes capacitors 42U, 42V, and 42W whose first ends are connected to the corresponding power lines 51U, 51V, and 51W, respectively, and whose second ends are connected to a ground node.

To the power output terminals 12U, 12V, and 12W for the three phases, first ends of the corresponding electric cables 21U, 21V, and 21W for the three phases in the power cable 20 are connected, respectively.

Second ends of the electric cables 21U, 21V, and 21W are connected to the corresponding three-phase motor windings 61U, 61V, and 61W in the motor body 61, respectively.

To the ground terminal 12G, a first end of the ground line 21G of the power cable 20 is connected.

A second end of the ground line 21G is connected to a motor housing (not illustrated) of the motor body 61 that houses the motor windings 61U, 61V, 61W, and the like. The motor housing is made of metal.

The ground terminal 12G is connected to a heat sink 70 via a ground line 80a. The heat sink 70 is a heat dissipation fin that dissipates heat generated from the power conversion circuit 14, and is grounded. The heat sink 70 is mounted on the circuit board for heat dissipation for at least one of a rectifier circuit 141 and an inverter circuit 143.

The power cable 20 includes the electric cables 21U, 21V, and 21W for the three phases which are core wires that transmit AC power to be supplied to the motor, and the ground line 21G for ensuring safety.

The ground line 21G also returns electromagnetic noise transmitted from the power conversion circuit 14 through the electric cables 21U, 21V, and 21W to the power conversion circuit 14 side, and prevents the electromagnetic noise from being emitted from the electric cables 21U, 21V, and 21W.

Each of the electric cables 21U, 21V, and 21W and the ground line 21G has a periphery coated, has a stranded wire structure at a set pitch interval, and is coated with a surface insulator 22. The power cable 20 is a generally known cable including a ground line.

To a pair of information input terminals 13a and 13b, first ends of signal lines 31a and 31b of a signal transmission cable 30 are connected, respectively.

Second ends of the pair of signal lines 31a and 31b are connected to an output end of the encoder circuit 62.

The signal lines 31a and 31b transmit, as a feedback signal, angle information of a rotation shaft of the motor 60 output from the encoder circuit 62, to the pair of information input terminals 13a and 13b.

To the shield terminal 13G, a first end of a shield 31G of the signal transmission cable 30 is connected.

A second end of the shield 31G is connected to the motor housing of the motor body 61.

The shield 31G is electrically connected to the ground line 21G of the power cable 20 on the motor 60 side via the motor housing of the motor body 61.

The signal transmission cable 30 includes the signal lines 31a, 31b which are core wires that transmit angle information of the rotation shaft of the motor 60, an interlayer insulator that coats the signal lines 31a, 31b, and the mesh-like metal shield 31G that is disposed so as to surround the interlayer insulator and prevents electromagnetic noise from entering the signal lines 31a, 31b. The shield 31G is coated with a surface insulator 32. The signal transmission cable 30 is a generally known shielded cable.

The power input terminals 11U, 11V, 11W, the power output terminals 12U, 12V, 12W, the ground terminal 12G, the information input terminals 13a, 13b, and the shield terminal 13G are provided at ends of a surface of the circuit board (not illustrated).

The power conversion circuit 14 is a circuit that converts AC power input to the power input terminals 11U, 11V, 11W and supplied from the AC power source 50 into AC power to be supplied to the motor 60, and supplies the AC power to be supplied to the motor 60 to the power output terminals 12U, 12V, 12W. The power conversion circuit 14 is mounted on a surface of the circuit board.

The power conversion circuit 14 includes the rectifier circuit 141, a smoothing capacitor 142, and the inverter circuit 143.

The rectifier circuit 141 has input ends for the three phases connected to the respective power input terminals 11U, 11V, and 11W, converts an AC voltage of the input three-phase AC power into a single-phase DC voltage, and outputs the single-phase DC voltage to a pair of output ends. To a P bus 144P and an N bus 144N, the respective output ends of the rectifier circuit 141 are connected.

The rectifier circuit 141 is a full-wave rectifier circuit such as a three-phase bridge rectifier circuit using a rectifier element of a diode or a thyristor, and is a generally known three-phase rectifier circuit.

The smoothing capacitor 142 is connected between the P bus 144P and the N bus 144N, and smooths the single-phase DC power output from the output ends of the rectifier circuit 141.

The inverter circuit 143 has a pair of input ends connected to the pair of respective output ends of the rectifier circuit 141 via the P bus 144P and the N bus 144N, converts the power into an AC voltage on the basis of the input DC voltage, and outputs the converted three-phase AC power with a set voltage and frequency to output terminals for three phases. The output ends for the three phases of the inverter circuit 143 are connected to the respective power output terminals 12U, 12V, and 12W, AC power supplied from the output ends of the inverter circuit 143 and to be supplied to the motor is supplied to the motor windings 61U, 61V, and 61W of the motor 60 via the electric cables 21U, 21V, and 21W of the power cable 20, and the motor 60 is driven.

The inverter circuit 143 includes a U-phase inverter 143U, a V-phase inverter 143V, and a W-phase inverter 143W.

Figure 2:
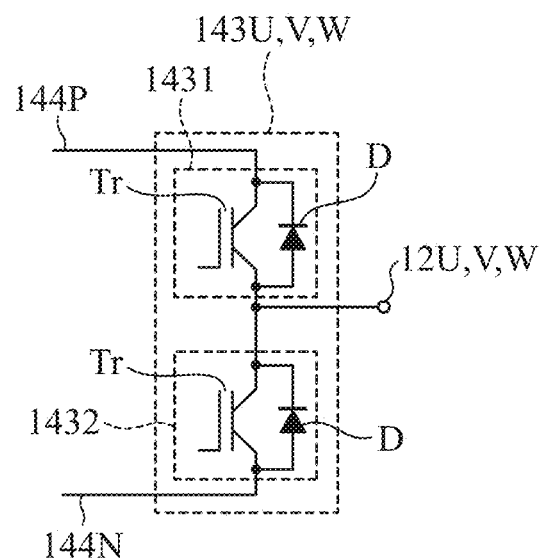
FIG. 2 is a circuit diagram commonly illustrating one phase of a three-phase inverter circuit in the motor drive system according to the first embodiment.

Each of the U-phase inverter 143U, the V-phase inverter 143V, and the W-phase inverter 143W includes an upper arm 1431 and a lower arm 1432 connected in series between the P bus 144P and the N bus 144N, as illustrated in FIG. 2 commonly illustrating one phase of the three-phase inverter circuit.

Connection points between the upper arm 1431 and the lower arm 1432 are output ends, and the output ends are connected to the corresponding respective power output terminals 12U, 12V, and 12W.

Each of the upper arm 1431 and the lower arm 1432 includes a transistor Tr which is a power semiconductor and a diode D connected in antiparallel to the transistor Tr.

The inverter circuit 143 is a generally known inverter circuit.

The encoder circuit 15 outputs encoder information on the basis of a feedback signal that is angle information of the rotation shaft in the motor 60, input to the information input terminals 13a, 13b via the signal lines 31a, 31b of the signal transmission cable 30 and supplied from the encoder circuit 62. The encoder circuit 15 is mounted on a surface of the circuit board.

The control circuit 16 controls the power conversion circuit 14, and feedback-controls the power conversion circuit 14 on the basis of the encoder information supplied from the encoder circuit 15.

The control circuit 16 outputs a control signal that is a switching command to the inverter circuit 143 in such a manner that the motor body 61 operates at the set voltage and frequency. In addition, the control circuit 16 calculates encoder information supplied from the encoder circuit 15, and feedback-controls a control signal to be supplied to the inverter circuit 143. The control signal is input to control electrodes of the transistors Tr in the upper arm 1431 and the lower arm 1432 of the inverter circuit 143.

In addition, for example, in a case of a pulse width modulation method, the control signal is a signal indicating timings of an ON signal and an OFF signal of the transistors Tr in the upper arm 1431 and the lower arm 1432.

The control circuit 16 may be constituted by a dedicated circuit, or may be incorporated as software in a microcomputer or a CPU, and may be any circuit as long as the circuit is used for a generally known servo amplifier. The control circuit 16 constituted by a dedicated circuit and those having the same function by software are collectively referred to as a control unit. Hereinafter, in order to prevent confusion in the description, both of these will be described as the control circuit 16.

The determination unit 17 detects a current input to the shield terminal 13G and flowing through the shield 31G of the signal transmission cable 30, and outputs disconnection detection information for disconnection in the shield 31G of the signal transmission cable 30.

Since the shield 31G is made of mesh-like metal, the disconnection detection information is information indicating a case where disconnection occurs in a part of the mesh, that is, information indicating a state in which the mesh is not completely disconnected but there is a risk of disconnection, or information indicating a case where the shield 31G is completely disconnected.

The determination unit 17 includes a current sensing unit 171, a current detection unit 172, a data storage unit 173, and a comparison unit 174.

The current sensing unit 171 is a generally known current sensor that measures a current flowing through a ground line 80b having a first end connected to the shield terminal 13G. A second end of the ground line 80b is connected to the heat sink 70.

The current detection unit 172 detects a current flowing through the ground line 80b and uses the current as a current value. The current detection unit 172 uses the current measured by the current sensing unit 171, as a current value for comparison with a set value.

Figure 3:
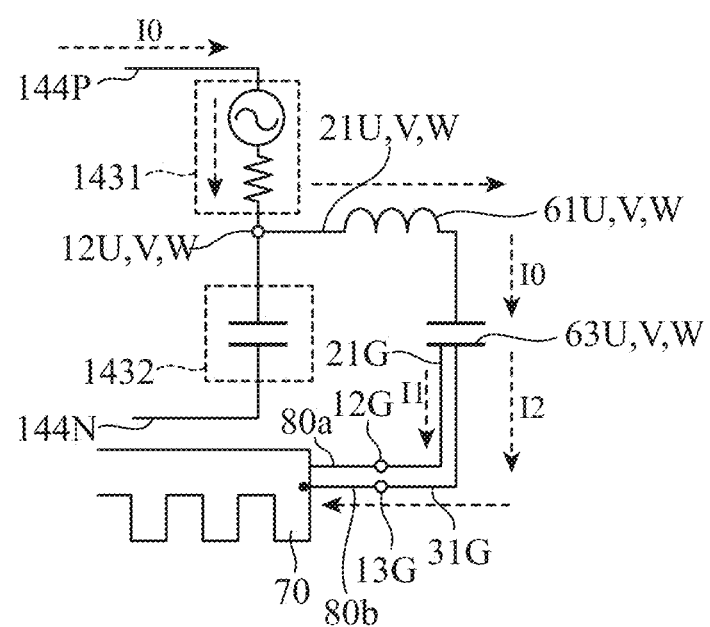
FIG. 3 is a simple equivalent circuit diagram for explaining a common mode generation mechanism for one phase of the three-phase inverter circuit illustrated in FIG. 2.

In an operation of the inverter circuit 143, that is, at a timing when the upper arm 1431 is turned on and the lower arm 1432 is turned off, an equivalent circuit as illustrated in FIG. 3 is obtained, and a common mode noise current I0 is generated by a voltage fluctuation of the power output terminals 12U, 12V, 12W due to switching. Although not illustrated, even at a timing when the upper arm is turned off and the lower arm is turned on, a voltage source is on the lower arm side and a stray capacitance is on the upper arm side in terms of an equivalent circuit, but this is only vertical inversion, and the common mode noise current I0 is generated by a potential fluctuation of the power output terminals 12U, 12V, 12W.

Since the ground line 21G of the power cable 20 and the shield 31G of the signal transmission cable 30 are electrically connected to each other on the motor 60 side by the motor housing of the motor 60, the common mode noise current I0 is divided into the ground line 21G of the power cable 20 and the shield 31G of the signal transmission cable 30.

The common mode noise current I0 is a sum of a current I1 flowing through the ground line 80a and a current I2 flowing through the ground line 80b.

The data storage unit 173 stores a set value serving as a threshold.

The set value at this time is a peak value of the common mode noise current determined from a combination of the power conversion circuit 14 which is a noise generation source, the power cable 20, the signal transmission cable 30, the length and arrangement of these cables, and the motor 60.

That is, the set value at this time is a value indicating a state in which a part of the mesh of the shield 31G of the signal transmission cable 30 is disconnected and is not completely disconnected but there is a risk of disconnection.

Note that the set value at this time may be a value indicating a case where the shield 31G of the signal transmission cable 30 is completely disconnected.

The comparison unit 174 compares the current I2 detected by the current detection unit 172 with the set value stored in the data storage unit 173, and outputs disconnection detection information for disconnection in the shield 31G of the signal transmission cable 30 on the basis of the comparison result.

When the value of the current I2 detected by the current detection unit 172 is equal to or less than the set value stored in the data storage unit 173, the comparison unit 174 outputs, to a display unit 90, disconnection detection information for disconnection in the shield 31G.

When disconnection occurs in a part of the shield 31G, a resistance value increases as a disconnection portion expands, and therefore, the current I2 divided from the common mode noise current JO and flowing through the ground line 80b changes to a smaller value as the resistance value increases.

By appropriate selection of the set value stored in the data storage unit 173, a disconnection state of the shield 31G can be found by the disconnection detection information output from the comparison unit 174 to the display unit 90, and complete disconnection of the shield 31G can be prevented.

Note that when the set value is a value indicating that the shield 31G of the signal transmission cable 30 is disconnected, the comparison unit 174 outputs, to the display unit 90, disconnection detection information indicating that the shield 31G is disconnected.

The current detection unit 172 and the comparison unit 174 may be incorporated as software in a microcomputer or a CPU. When the control circuit 16 is incorporated as software in a microcomputer or a CPU, it is only required to incorporate the current detection unit 172 and the comparison unit 174 as software in the same microcomputer or CPU.

The display unit 90 is constituted by an LED lamp independently disposed on the circuit board or an LED lamp of a controller unit connected to the servo amplifier, or uses a display screen of a host control computer as a display unit.

[Operation of Motor Drive System]

Next, the motor drive system according to the first embodiment will be described.

By turning on a power source switch, U-phase AC power, V-phase AC power, and W-phase AC power are supplied from the AC power source 50 to the power conversion device 10 via the U-phase power line 51U, the V-phase power line 51V, the W-phase power line 51W, the noise filter 40, and the power input terminals 11U, 11V, and 11W.

In the power conversion device 10, first, the rectifier circuit 141 converts the U-phase AC power, the V-phase AC power, and the W-phase AC power into a single-phase DC voltage, the smoothing capacitor 142 smooths the DC voltage. Thereafter, the inverter circuit 143 converts the smoothed DC power into three-phase AC voltage on the basis of a control signal supplied from the control circuit 16, and outputs the converted three-phase AC power with a voltage and a frequency set as the AC power to be supplied to the motor 60 to the power output terminals 12U, 12V, 12W.

The control signal supplied from the control circuit 16 is feedback-controlled in accordance with the encoder information supplied from the encoder circuit 15.

The three-phase AC power supplied to the power output terminals 12U, 12V, and 12W is supplied to the motor windings 61U, 61V, and 61W of the motor 60 via the electric cables 21U, 21V, and 21W of the power cable 20, respectively, and the motor 60 is rotationally driven.

Meanwhile, when the motor 60 is rotationally driven, the encoder circuit 62 obtains angle information of the rotation shaft in the motor 60, and the angle information of the rotation shaft is input from the encoder circuit 62 to the encoder circuit 15 via the signal lines 31a, 31b of the signal transmission cable 30 and the information input terminals 13a, 13b.

The encoder information supplied from the encoder circuit 15 is input to the control circuit 16, and is used for feedback control of a control signal to be supplied to the inverter circuit 143. [Common mode noise current I0 generation mechanism]

When the inverter circuit 143 performs a high-speed switching operation in accordance with a control signal supplied from the control circuit 16, a common mode noise is generated between the electric cables 21U, 21V, 21W of the power cable 20 and the ground, and the common mode noise current I0 flows through the electric cables 21U, 21V, 21W.

First, a common mode noise current I0 generation mechanism will be described.

In order to simplify the description, one phase of the inverters 143U, 143V, and 143W in the inverter circuit 143 will be described with reference to FIG. 3.

FIG. 3 illustrates a simple equivalent circuit diagram when the transistor Tr of the upper arm 1431 is turned on and the transistor Tr of the lower arm 1432 is turned off.

The voltage of the power output terminals 12U, 12V, 12W changes from the potential of the N bus 144N to the potential of the P bus 144P. During this change, a common mode voltage is applied to stray capacitances of the electric cables 21U, 21V, 21W of the power cable 20 and stray capacitances between the motor windings 61U, 61V, 61W of the motor 60 and a stator of the motor 60, and the common mode noise current TO flows from the electric cables 21U, 21V, 21W and the motor windings 61U, 61V, 61W to the motor housing of the motor 60 via stray capacitances 63U, 63V, 63W.

The stray capacitances 63U, 63V, and 63W illustrated in FIG. 3 are a sum of the stray capacitances of the corresponding electric cables 21U, 21V, and 21W and the stray capacitances between the corresponding motor windings 61U, 61V, and 61W and the stator of the motor 60, respectively.

Each of the stray capacitances 63U, 63V, 63W is a value depending on the motor 60.

When the common mode voltage changes by $\Delta V$ during time $\Delta t$, and a value of the stray capacitance of each of the stray capacitances 63U, 63V, 63W is represented by C, the common mode noise current I0 is represented by $C \times \Delta V / \Delta t$.

The common mode noise current I0 flows by being divided into the current I1 flowing through the ground line 21G of the power cable 20 connected to the motor housing of the motor 60 and the current I2 flowing through the shield 31G of the signal transmission cable 30.

The current I1 flows to the heat sink 70 via the ground terminal 12G and the ground line 80a.

The current I2 flows to the heat sink 70 via the shield terminal 13G and the ground line 80b.

Meanwhile, when the transistor Tr of the upper arm 1431 is turned off and the transistor Tr of the lower arm 1432 is turned on, the voltage changes from the potential of the P bus 144P to the potential of the N bus 144N, the common mode noise current I0 flows, and the current I1 and the current I2 flow.

The common mode noise current I0 flows through each of the inverters 143U, 143V, and 143W of the three phases by the above-described common mode noise current I0 generation mechanism, and the current I1 and the current I2 flow.

[Common Mode Noise Current I0 Propagation Path]

Next, a common mode noise current I0 propagation path in the motor drive system will be described with reference to FIG. 4.

Most of the common mode noise current I0 is the current I1 flowing from the motor housing of the motor 60 to the ground line 21G of the power cable 20. The current I1 flows from the ground line 21G through the ground line 80a, the heat sink 70, and the capacitors 42U, 42V, 42W of the noise filter 40, and returns to the inverter circuit 143 which is a noise source via the P bus 144P and the N bus 144N.

The remaining portion of the common mode noise current I0 is the current I2 flowing from the motor housing of the motor 60 to the shield 31G of the signal transmission cable 30. The current I2 flows from the shield 31G through the ground line 80b, the heat sink 70, and the capacitors 42U, 42V 42W of the noise filter 40, and returns to the inverter circuit 143 which is a noise source via the P bus 144P and the N bus 144N.

[Shunt Ratio Between Current I1 and Current I2]

A parameter for determining a shunt ratio between the current I1 and the current I2 divided from the common mode noise current I0 when the power cable and the signal transmission cable are sufficiently separated from each other will be described.

In order to simplify the description, one phase of the inverters 143U, 143V, and 143W in the inverter circuit 143 will be described with reference to FIG. 5.

The electric cables 21U, 21V, 21W of the power cable 20 each have a self-inductance that is a sum of a corresponding one of inductances 21LU, 21LV, 21LW of the cables themselves and a corresponding one of mutual inductances 21MU, 21MV, 21MW between a corresponding one of the electric cables 21U, 21V, 21W and the ground line 21G of the power cable 20.

The ground line 21G of the power cable 20 has a self-inductance that is a sum of an inductance 21LG of the cable itself and each of the mutual inductances 21MU, 21MV, 21MW between the ground line 21G and the electric cables 21U, 21V, 21W of the power cable 20.

The shield 31G of the signal transmission cable 30 has a self-inductance 31LG.

A stray capacitance is present between each of the electric cables 21U, 21V, 21W of the power cable 20 and the ground line 21G connected to the motor housing of the motor 60, and a stray capacitance is present between each of the motor windings 61U, 61V, 61W of the motor 60 and the stator of the motor 60.

As described with reference to FIG. 4, the common mode noise current I0 propagation path includes two paths of the current I1 flowing through the ground line 21G and the current I2 flowing through the shield 31G, divided from the common mode noise current I0.

A shunt ratio between the current I1 and the current I2 is determined by an impedance in each of the current paths of the current I1 and the current I2.

When the mutual inductances 21MU, 21MV, 21MW between the electric cables 21U, 21V, 21W and the ground line 21G of the power cable 20 are large, the impedance in the current path of the current I1 is low, and therefore the current I1 is divided in a large amount from the common mode noise current I0.

On the other hand, when coupling is weak and the mutual inductances 21MU, 21MV, 21MW are small, the impedance in the current path of the current I1 is relatively larger than the impedance in the current path of the current I2, and therefore the current I2 is relatively large.

When the length of the power cable 20 increases, the inductances 21LU, 21LV, 21LW of the electric cables 21U, 21V, 21W of the power cable 20, the mutual inductances 21MU, 21MV, 21MW, the inductance 21LG of the ground line 21G of the power cable 20, and the self-inductance 31LG of the shield 31G of the signal transmission cable 30 all increase.

Figure 4:
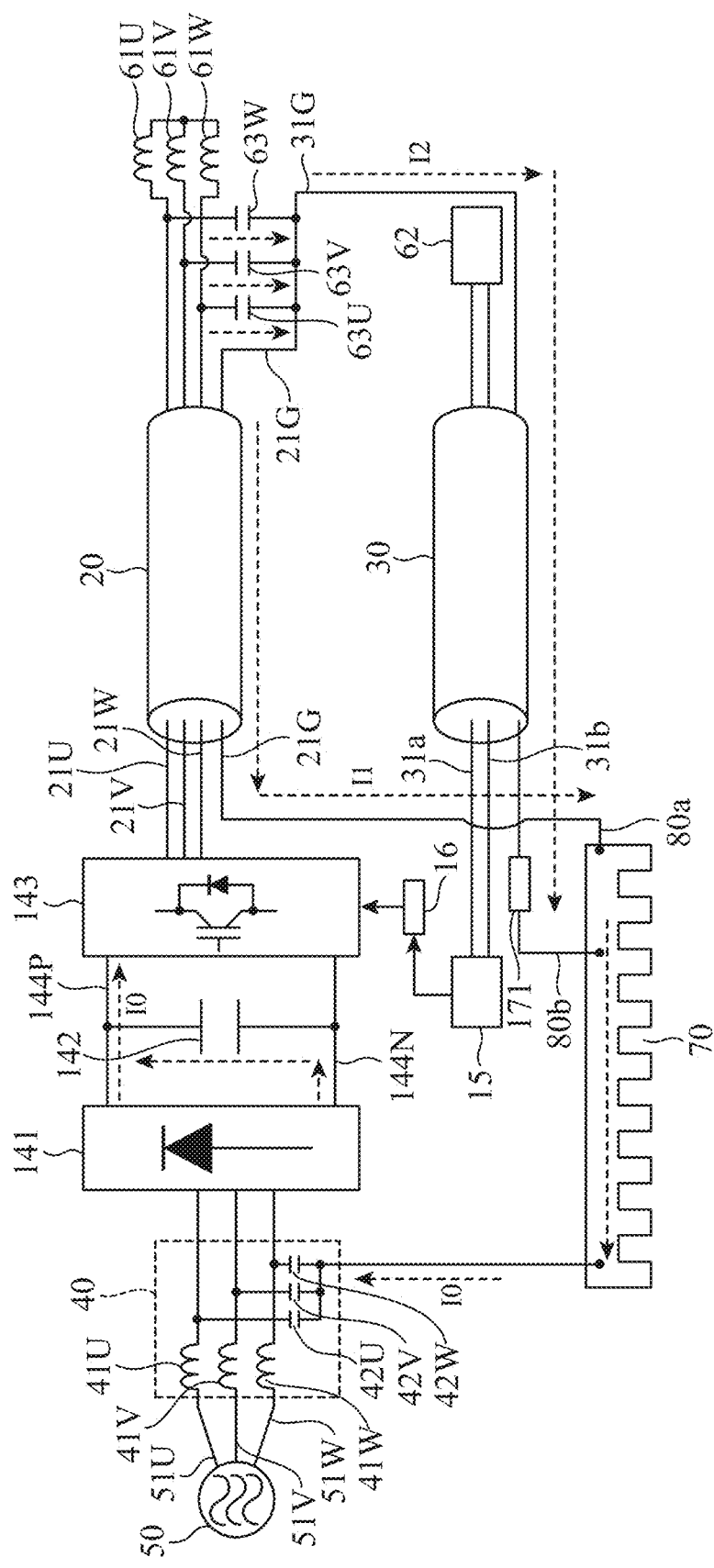
FIG. 4 is a circuit diagram illustrating the motor drive system according to the first embodiment and illustrating a propagation path of a common mode current.

Although not illustrated in FIG. 4, strictly, there is also a current component that flows back to the common mode noise current I0 after leaking from the power line 51U, 51V, 51W side.

However, in the first embodiment, since the noise filter 40 having the common mode choke coils 41U, 41V, 41W that masks the impedance of the power lines 51U, 51V, 51W with high impedance and the capacitors 42U, 42V, 42W each including a sufficiently large capacitance is included, the noise current leaking from the power line 51U, 51V, 51W side is a very small value with respect to the common mode noise current I0, and is a negligible value with respect to the current I1 and the current I2.

Therefore, the current I1 and the current I2 are determined by the length of the power cable 20, the length of the signal transmission cable 30, a line-to-line distance between the electric cables 21U, 21V, 21W and the ground line 21G in the power cable the pitch interval of the stranded wire structure in the power cable 20, the structure of the motor 60, the characteristics of the noise filter 40, and a voltage between the P bus 144P and the N bus 144N.

Therefore, by appropriate selection of the power cable 20, the signal transmission cable 30, and the noise filter 40, a value of the current I2 flowing in a normal state can be appropriately set in order to obtain the disconnection detection information.

Note that the line-to-line distance in the power cable 20 and the pitch interval of the stranded wire structure are factors that determine the mutual inductances 21MU, 21MV, 21MW in the power cable 20.

[Method for Detecting Disconnection of Signal Transmission Cable 30]

Next, a method for detecting disconnection of the signal transmission cable 30 by the determination unit 17 will be described with reference to a flowchart illustrated in FIG. 6.

Figure 6:
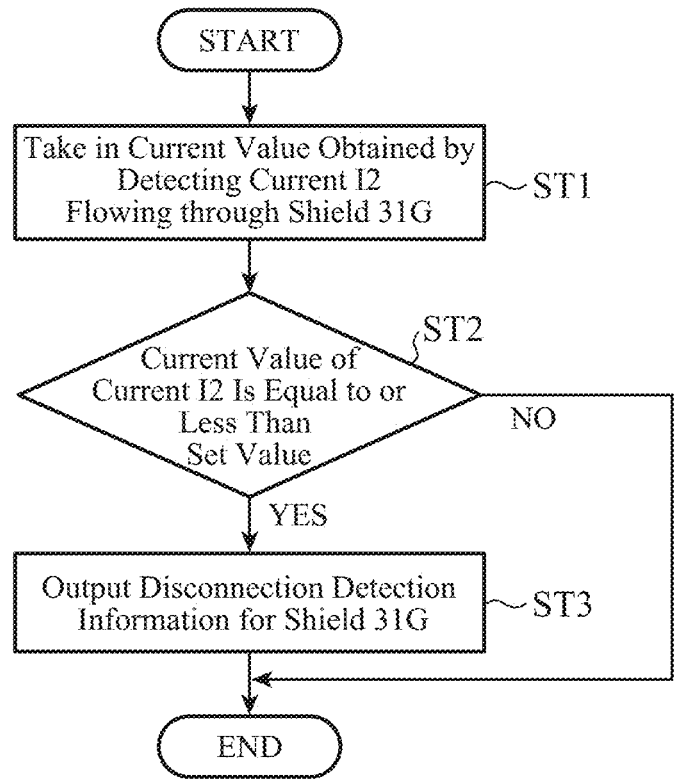
FIG. 6 is a flowchart for detecting disconnection of a shield of a signal transmission cable in the motor drive system according to the first embodiment.

The current detection unit 172 and the comparison unit 174 in the determination unit are incorporated as software in a microcomputer or a CPU, as their functions, and disconnection of the signal transmission cable 30 is detected according to the flowchart illustrated in FIG. 6.

In step ST1, the current detection unit 172 takes in a current value obtained by detecting the current I2 flowing through the ground line 80b using the current sensing unit 171.

That is, step ST1 is a detection step in which the current detection unit 172 detects the current I2 flowing through the shield 31G of the signal transmission cable 30 electrically connected to the ground line 21G of the power cable 20 on the motor 60 side, out of the common mode noise current I0 generated by an operation of the inverter circuit 143.

In step ST2, the comparison unit 174 compares the current value of the current I2 flowing through the shield 31G detected in step ST1 with a set value stored in the data storage unit 173 (comparison step), and if the comparison unit 174 determines that the current value of the current I2 is equal to or less than the set value (determination step), the process proceeds to step ST3. In the determination step, if the current value of the current I2 exceeds the set value, the process ends.

When the process proceeds to step ST3, the comparison unit 174 outputs, to the display unit 90, disconnection detection information indicating a state in which there is a risk of disconnection of the shield 31G of the signal transmission cable 30.

Steps ST2 and ST3 are disconnection detection steps in which the comparison unit 174 compares the current value of the current I2 flowing through the shield 31G detected in the detection step with the set value stored in the data storage unit 173, and performs disconnection detection of the shield 31G of the signal transmission cable 30 on the basis of the comparison result.

The display unit 90 displays a warning about a disconnection state of the shield 31G of the signal transmission cable 30 to a user on the basis of the disconnection detection information supplied from the comparison unit 174.

The user can be notified of a fact that there is a risk of disconnection of the shield 31G of the signal transmission cable 30 by the display of the display unit 90, and can replace the signal transmission cable 30 and the power cable 20 before disconnection of the cables.

As a result, disconnection of the signal transmission cable 30 can be prevented, and process delay due to stop of a line using the motor 60 due to the disconnection of the cable and a loss due to repair of a device and equipment in the line can be prevented.

Similarly, by the display of the display unit 90 based on the disconnection detection information supplied from the comparison unit 174, contact failures of a connector connecting the power cable 20 to the power output terminals 12U, 12V, 12W and the ground terminal 12G, a connector connecting the power cable 20 to the motor 60, a connector connecting the signal transmission cable 30 to the information input terminal 13a, 13b and the shield terminal 13G, and a connector connecting the signal transmission cable 30 to the motor 60 can be found. [Another example of how to set a set value stored in data storage unit 173]

Figure 7:
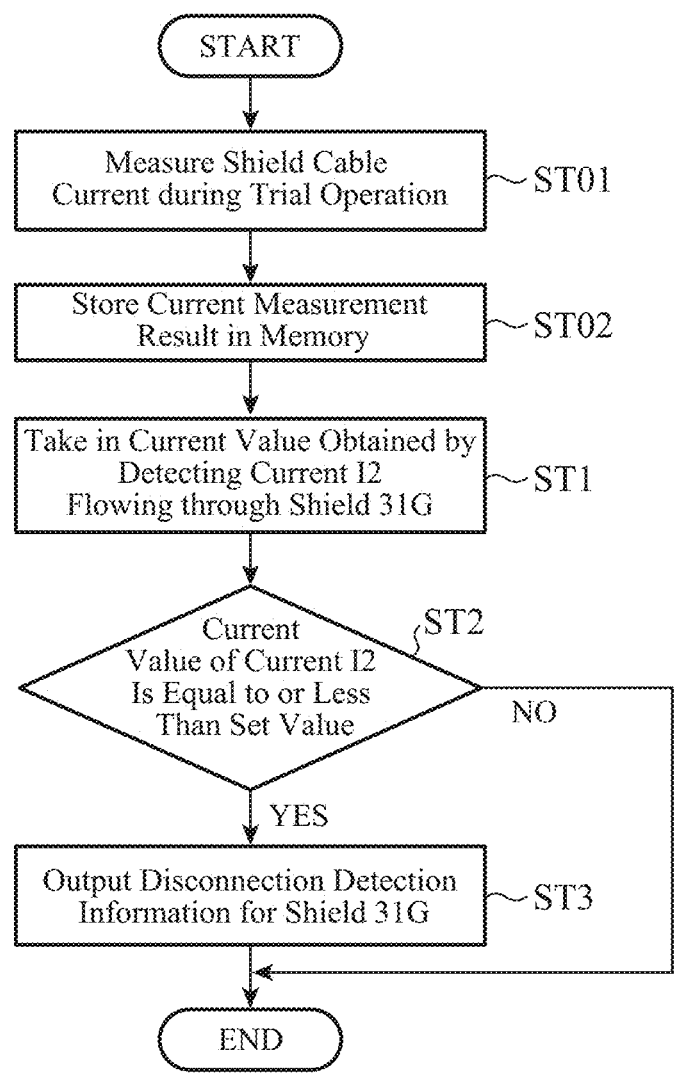
FIG. 7 is a flowchart illustrating another example for detecting disconnection of a shield of a signal transmission cable in the motor drive system according to the first embodiment.

Another example of how to set a set value stored in the data storage unit 173 in the method for detecting disconnection of the signal transmission cable 30 by the determination unit 17 according to the first embodiment will be described with reference to a flowchart illustrated in FIG. 7.

The set value stored in the data storage unit 173 in the motor drive system according to the first embodiment is determined by the common mode noise current determined from a combination of the power conversion circuit 14, the encoder circuit 15, the control circuit 16, the power cable 20, the signal transmission cable 30, and the motor 60. However, in another example, as the set value, a value determined by a current value obtained by detecting the current I2 flowing through the ground line 80b by a trial operation (cable diagnosis operation) in which output voltage for all the three phases in the power conversion circuit of the motor drive system is zero, and no torque for rotating the rotor of the motor occurs, and only a noise current occurs is used. The other points are the same or similar.

That is, in step ST01 during trial operation of the motor drive system, the transistors Tr of the upper arms 1431 are simultaneously turned on and the transistors Tr of the lower arms 1432 are simultaneously turned off of the inverters 143U, 143V, 143W in the inverter circuit 143, or conversely the transistors T of the upper arms 1431 are simultaneously turned off and the transistors T of the lower arms 1432 are simultaneously turned on, the current sensing unit 171 detects the current I2 flowing through the ground line 80b, and the current detection unit 172 takes in the detected current I2. This is because the output three phases of the power conversion circuit are all short-circuited in PWM control, output voltage is zero, i.e. so-called zero vector state, and when this state is continued, no current for rotating the motor flows, and no torque occurs in the rotor of the motor, so that the target device to be controlled does not operate and is in a standby state. In a case of ordinary PWM control, a command that output voltage is zero is issued, switching in which the transistors Tr of the upper arms 1431 are simultaneously turned on and the transistors Tr of the lower arms 1432 are simultaneously turned off, next the transistors Tr of the upper arms 1431 are simultaneously turned off and the transistors Tr of the lower arms 1432 are simultaneously turned on is performed repeatedly.

In step ST02, a value is output as a set value to the data storage unit 173 on the basis of the current value of the current I2 taken in by the current detection unit 172.

The set value stored in the data storage unit 173 may be the current value of the current I2 itself taken in by the current detection unit 172 or may be, for example, a current value obtained by multiplying the current value of the current I2 by 0.8.

When the motor drive system is normally operated, or the upper arms 1431 and the lower arms 1432 are switched in such a way as to output voltage is zero in different timing from that as above, similarly to the method for detecting disconnection of the signal transmission cable 30 by the determination unit 17 illustrated in FIG. 6, in steps ST1 to ST3, the current detection unit 172 detects the current I2 flowing through the shield 31G of the signal transmission cable 30, and the current value of the current I2 is compared with the set value stored in the data storage unit 173. If the current value of the current I2 is equal to or less than the set value, disconnection detection information indicating a state in which there is a risk of disconnection of the shield 31G of the signal transmission cable 30 is output to the display unit 90.

Since the set value stored in the data storage unit 173 is a value based on the current I2 flowing through the ground line 80b when the transistor transistors Tr of the upper arms 1431 are simultaneously turned on and the transistor transistors Tr of the lower arms 1432 are simultaneously turned off or conversely the transistors Tr of the upper arms 1431 are simultaneously turned off and the transistors Tr of the lower arms 1432 are simultaneously turned on, a current of a frequency component for driving the motor 60 does not flow, and furthermore the common mode noise currents generated by the inverters 143U, 143V, and 143W overlap with each other. Therefore, the instantaneous common mode noise current I0 due to fluctuation of a common mode voltage can be detected under a maximum condition, and a highly accurate value as a measured value can be obtained. As a result, the disconnection detection information for the shield 31G of the signal transmission cable 30 can be obtained with high accuracy.

If noise is measured by simultaneously turning on the transistors Tr of the upper arms 1431 and simultaneously turning off the transistor Tr of the lower arms 1432, or conversely simultaneously turning off the transistors Tr of the upper arms 1431 and simultaneously turning on the transistor Tr of the lower arm 1432 every time before normal operation of the motor drive system starts after stop, the accuracy of diagnosis is further improved.

Note that, in the above example, the method for detecting disconnection of the signal transmission cable 30 by the determination unit 17 is performed at all times during normal operation of the motor drive system. However, disconnection may be detected periodically while switching in a state that output voltage is zero before the normal operation, after turning on the power source that is, on condition that the transistors Tr of the upper arms 1431 are simultaneously turned on and the transistors Tr of the lower arms 1432 are simultaneously turned off, or conversely the transistors Tr of the upper arms 1431 are simultaneously turned off and the transistors Tr of the lower arms 1432 are simultaneously turned on, and at the time of detecting disconnection, the disconnection detection information may be obtained by comparing the current I2 flowing through the ground line 80b when the transistors Tr of the upper arms 1431 are simultaneously turned on and the transistors Tr of the lower arms 1432 are simultaneously turned off or conversely the transistors Tr of the upper arms 1431 are simultaneously turned off and the transistors Tr of the lower arms 1432 are simultaneously turned on, with the set value stored in the data storage unit 173.

In this example, since the current I2 flowing through the ground line 80b has a value larger than the current I2 flowing through the ground line 80b in a normal state, the disconnection detection information for the shield 31G of the signal transmission cable 30 can be obtained with higher accuracy.

The motor drive system according to the first embodiment configured as described above, electrically connects the ground line 21G of the power cable 20 and the shield 31G of the signal transmission cable 30 to each other on the motor 60 side, detects the current I2 flowing through the shield 31G of the signal transmission cable 30 out of the common mode noise current I0 generated by the operation of the inverter circuit 143 of the power conversion circuit 14 in the power conversion device 10, and outputs the disconnection detection information for disconnection in the shield of the signal transmission cable. Therefore, disconnection of the signal transmission cable 30 can be prevented without adding a new power source or signal circuit to the motor drive system in order to obtain the disconnection detection information for the shield of the signal transmission cable, and before disconnection of the signal lines 31a, 31b of the signal transmission cable 30 occurs and a signal cannot be transmitted, deterioration of the signal transmission cable 30 can be found at a disconnection stage of the shield 31G of the signal transmission cable 30, and the signal transmission cable 30 can be replaced.

As a result, process delay due to stop of a line using the motor 60 and a loss due to repair of a device and equipment in the line can be prevented.

Furthermore, since a timing when the signal transmission cable 30 is to be replaced can be found in advance, occurrence of communication error by the signal lines 31a, 31b of the signal transmission cable 30 due to disconnection of the signal lines 31a, 31b of the signal transmission cable 30, direct coupling of noise derived from the inverters 143U, 143V, 143W to the signal lines 31a, 31b of the signal transmission cable 30, or coupling of unexpected external noise to the signal lines 31a, 31b of the signal transmission cable 30 due to a progress of disconnection of the shield 31G of the signal transmission cable 30 can be prevented.

As a result, process delay due to stop of a line using the motor 60 and a loss due to repair of a device and equipment in the line can be prevented.

In addition, since the noise filter 40 including the common mode choke coils 41U, 41V, 41W and the capacitors 42U, 42V, 42W is connected between the power conversion device 10 and the AC power source 50, a noise current leaking from the power line 51U, 51V, 51W side in the current I2 flowing through the shield 31G of the signal transmission cable 30 can be ignored, and the disconnection detection information for the shield of the signal transmission cable can be obtained with high accuracy.

Second Embodiment

A motor drive system according to a second embodiment will be described with reference to FIG. 8.

The motor drive system according to the second embodiment is different from the motor drive system according to the first embodiment in that the motor drive system according to the first embodiment uses, as the AC power source 50, a power source that supplies AC power of three phases consisting of a U phase, a V phase, and a W phase as, whereas the motor drive system according to the second embodiment uses a DC power source 50A, and a power conversion circuit 14A includes a smoothing capacitor 142 and an inverter circuit 143 by using the DC power source 50A, and the motor drive system according to the second embodiment is similar to the motor drive system according to the first embodiment in the other points.

Figure 8:
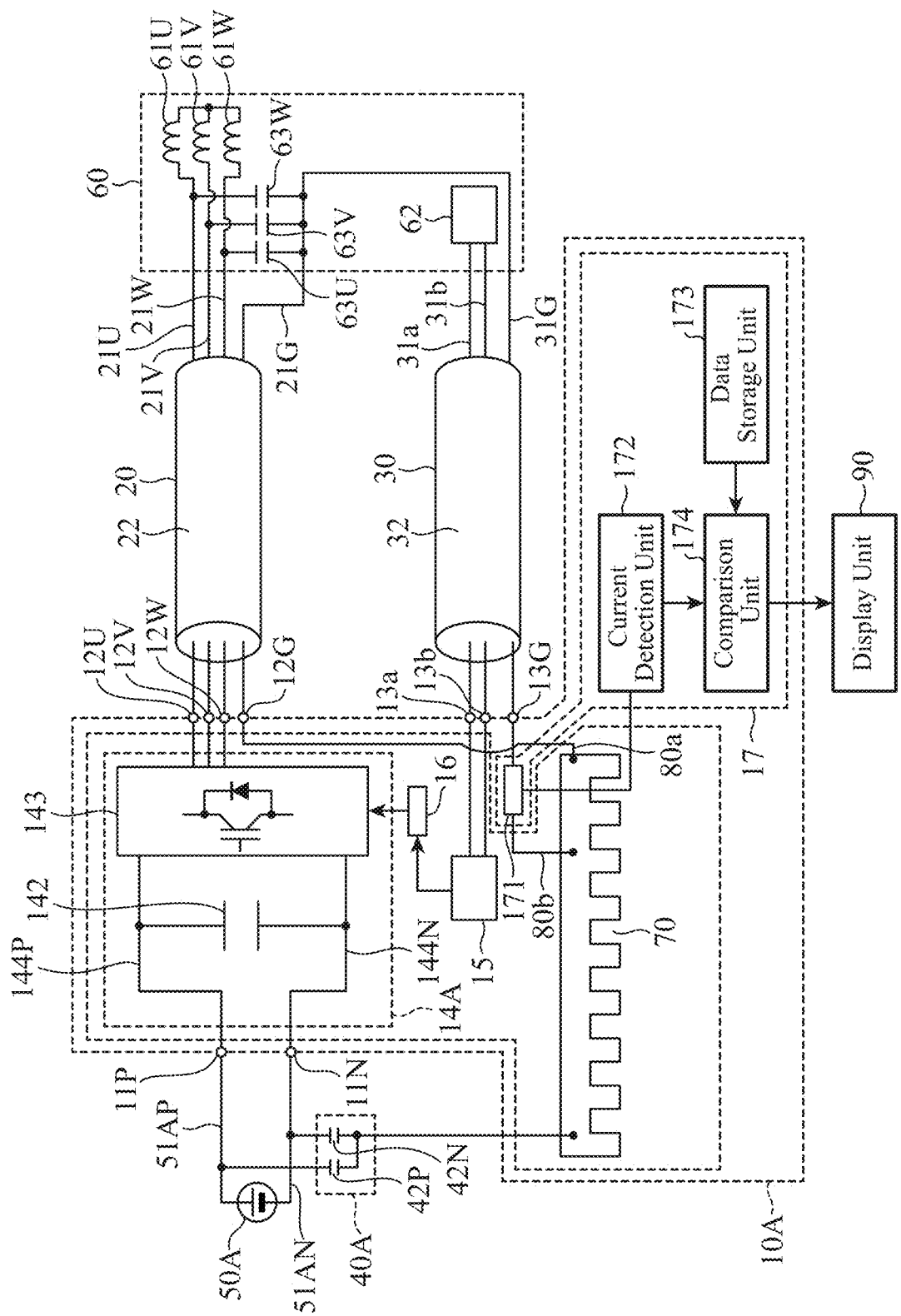
FIG. 8 is a circuit diagram illustrating a motor drive system according to a second embodiment.

In FIG. 8, the same reference numerals as in FIG. 1 denote the same or corresponding portions.

That is, the DC power source 50A is a DC power source that converts AC into DC using a battery or outside a device, and is connected to power lines 51AP, 51AN.

The power conversion device 10A includes a power input terminal 11P, 11N, a power output terminals 12U, 12V, 12W, a ground terminal 12G, an information input terminal 13a, 13b, a shield terminal 13G, the power conversion circuit 14A, an encoder circuit 15, a control circuit 16 serving as a control unit, and a determination unit 17. The power conversion circuit 14A, the encoder circuit 15, and the control circuit 16 constitute a servo amplifier. The power conversion device 10A is mounted on a circuit board (not illustrated).

The power input terminals 11P and 11N are connected to the corresponding power lines 51AP and 51AN, respectively, via a noise filter 40A.

The noise filter 40A includes capacitors 42P and 42N having first ends connected to the corresponding power lines 51AP and 51AN, respectively, and having second ends connected to a ground node.

The noise filter 40A may include common mode choke coils each connected between a corresponding one of the power lines 51AP and 51AN and a corresponding one of the power input terminals 11P and 11N, and capacitors whose first ends are each connected to a corresponding one of the power lines 51AP and 51AN, and whose second ends are connected to a ground node.

By inclusion of the noise filter 40A, a noise current leaking from the power line 51AP, 51AN side is a very small value with respect to a common mode noise current and is a negligible value.

In addition, by inclusion of the capacitors 42P and 42N inside the device, the capacitors 42P and 42N are less likely to be affected by external noise.

The power conversion circuit 14A includes the smoothing capacitor 142 and the inverter circuit 143.

The smoothing capacitor 142 is connected between a P bus 144P and an N bus 144N connected to the power input terminals 11P and 11N, respectively, and smooths DC power supplied from the DC power source 50A.

The inverter circuit 143 has a pair of input ends each connected to a corresponding one of the P bus 144P and the N bus 144N, converts the power into an AC voltage on the basis of the smoothed DC voltage, and outputs the converted three-phase AC power with a set voltage and frequency to output ends for three phases. The inverter circuit 143 is the same as the inverter circuit 143 of the power conversion circuit 14 in the motor drive system according to the first embodiment.

The motor drive system according to the second embodiment is different from the motor drive system according to the first embodiment only in that the power source is the DC power source 50A, and accordingly, the power conversion circuit 14A is changed so as to match the DC power source 50A. Therefore, the motor drive system according to the second embodiment performs a similar operation to the motor drive system according to the first embodiment, and can obtain a similar effect.

Third Embodiment

A motor drive system according to a third embodiment will be described with reference to FIG. 9.

The motor drive system according to the third embodiment is different from the motor drive system according to the first embodiment in that each of capacitors 18a, 18b is connected between a corresponding one of a pair of buses connecting a rectifier circuit 141 and an inverter circuit 143 to each other, that is, a P bus 144P and an N bus 144N, and a heat sink 70 serving as a ground node, and the motor drive system according to the third embodiment is similar to the motor drive system according to the first embodiment in the other points.

Figure 9:
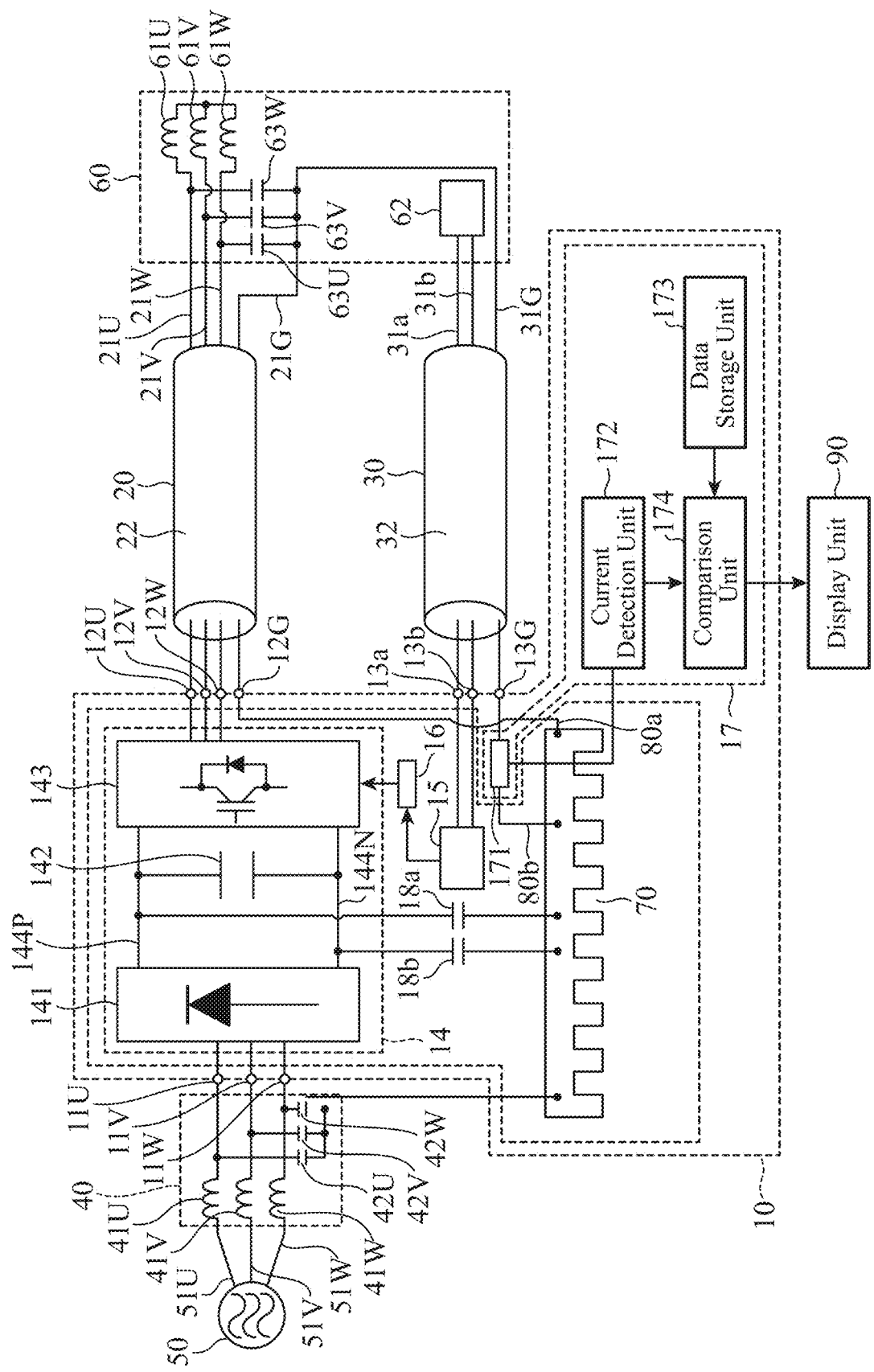
FIG. 9 is a circuit diagram illustrating a motor drive system according to a third embodiment.

In FIG. 9, the same reference numerals as in FIG. 1 denote the same or corresponding portions.

The capacitor 18a is connected between the P bus 144P and the ground node, and the capacitor 18b is connected between the N bus 144N and the ground node.

As a result, an impedance in a propagation path serving as a circulation path through which a common mode noise current I0 flows is low, so that there is an effect of performing impedance masking on a power line 51U, 51V, 51W side.

A noise current flowing through each of the P bus 144P and the N bus 144N due to external noise derived from the power line 51U, 51V, 51W side flows to the heat sink 70 by the capacitor 18a, 18b.

Therefore, an influence of external noise derived from the power line 51U, 51V, 51W side can be suppressed, the influence of the external noise on a current I2 flowing through a shield 31G of a signal transmission cable 30 can be ignored, and disconnection detection information for the shield of the signal transmission cable can be obtained with high accuracy.

Moreover, since the capacitor 18a is connected to the P bus 144P and the capacitor 18b is connected to the N bus 144N on a circuit board, the noise filter is mounted inside a power conversion device 10. Therefore, a function as the noise filter can be sufficiently exhibited.

Fourth Embodiment

A motor drive system according to a fourth embodiment will be described with reference to FIGS. 10 and 11.

The motor drive system according to the fourth embodiment is different from the motor drive system according to the first embodiment in that both a power cable 20 and a signal transmission cable 30 are inserted into the inside with an insulating coating 23, and the motor drive system according to the fourth embodiment is similar to the motor drive system according to the first embodiment in the other points.

Figure 10:
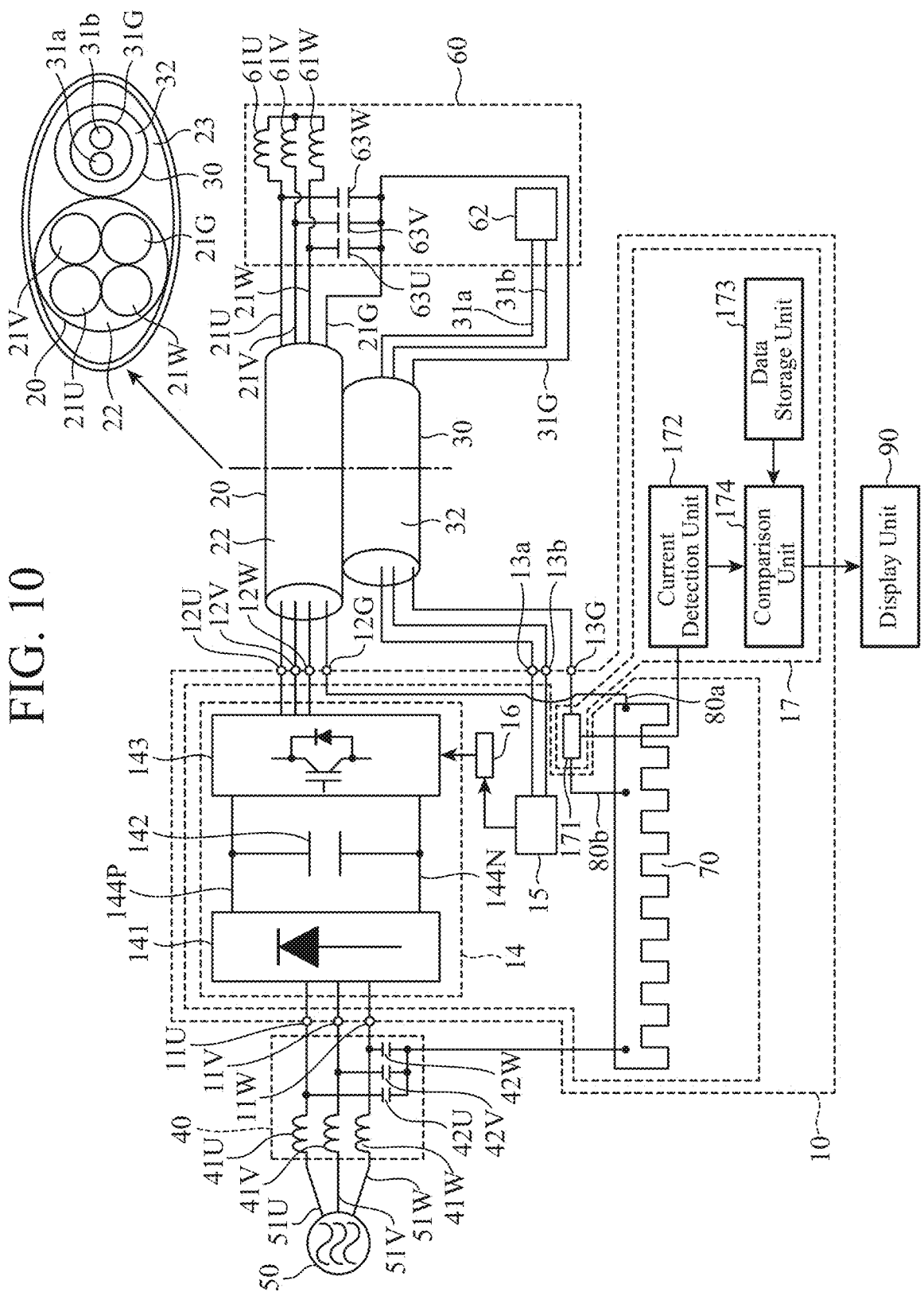
FIG. 10 is a circuit diagram illustrating a motor drive system according to a fourth embodiment.

In FIG. 10, the same reference numerals as in FIG. 1 denote the same or corresponding portions.

Figure 5:
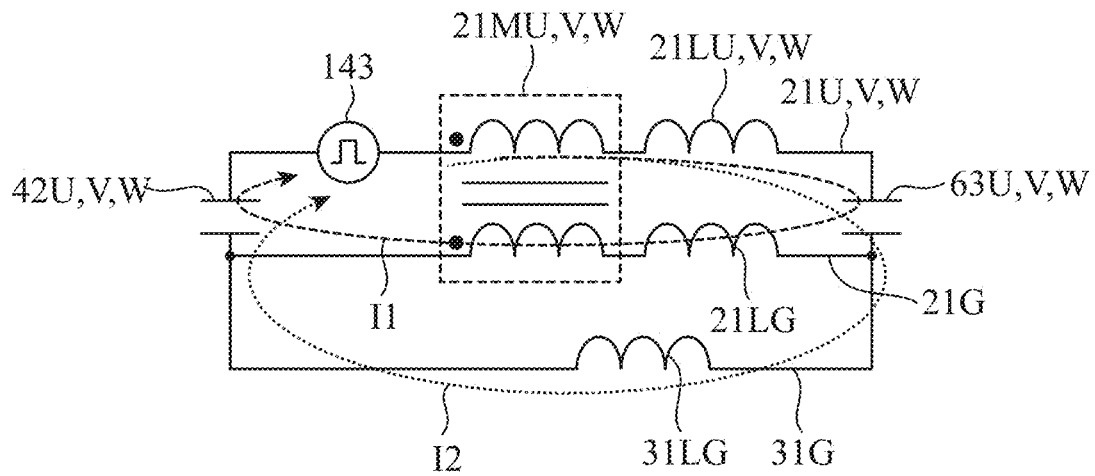
FIG. 5 is an equivalent circuit diagram illustrating a propagation path of a common mode current for one phase of the three-phase inverter circuit illustrated in FIG. 4.
Figure 11:
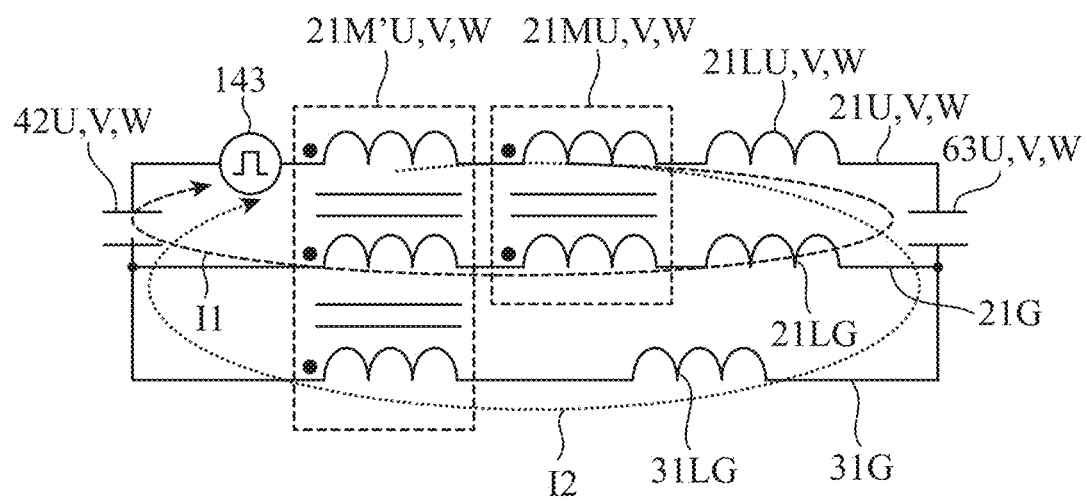
FIG. 11 is an equivalent circuit diagram illustrating a propagation path of a common mode current in the motor drive system according to the fourth embodiment.

In FIG. 11, the same reference numerals as in FIG. 5 denote the same or corresponding portions.

The power cable 20 and the signal transmission cable 30 are arranged adjacent to each other, that is, partially in contact with each other, and peripheries of the power cable 20 and the signal transmission cable 30 are coated with the insulating coating 23 and integrated.

Since the power cable 20 and the signal transmission cable 30 are adjacent to each other, mutual inductances 21M'U, 21M'V, 21M'W is present among electric cables 21U, 21V, 21W of the power cable 20, a ground line 21G, and a shield 31G of the signal transmission cable 30.

Since the power cable 20 and the signal transmission cable 30 are integrated, as compared with a case where the power cable 20 and the signal transmission cables 30 are arranged separately so as to be close to each other, fluctuations in the mutual inductances 21M'U, 21M'V, 21M'W are small, and there is no fluctuation of an impedance in the propagation path of the current I1 flowing through the ground line 21G of the power cable 20 or an impedance in the propagation path of the current I2 flowing through the shield 31G of the signal transmission cable 30.

As a result, since the fluctuation of the common mode noise current J0 during a normal operation of the motor drive system is small, the fluctuations of the current I1 and the current I2 are also small, and disconnection detection information for the shield 31G of the signal transmission cable 30 can be obtained with high accuracy.

Note that the embodiments can be freely combined to each other, any constituent element in each of the embodiments can be modified, or any constituent element in each of the embodiments can be omitted.

INDUSTRIAL APPLICABILITY

The motor drive system according to the present disclosure is suitably used for a factory robot or a factory machine tool.

REFERENCE SIGNS LIST 10, 10A: power conversion device, 11U, 11V, 11W: power input terminal, 12U, 12V, 12W: power output terminal, 12G: ground terminal, 13a, 13b: information input terminal, 13G: shield terminal, 14: power conversion circuit, 141: rectifier circuit, 142: smoothing capacitor, 143: inverter circuit, 1431: upper arm, 1432: lower arm, 144P: P bus, 144N: N bus, 15: encoder circuit, 16: control circuit, 17: determination unit, 18a, 18b: capacitor, 20: power cable, 21U, 21V, 21W: electric cable, 21G: ground line, 30: signal transmission cable, 31a, 31b: signal line, 31G: shield, 40: noise filter, 41U, 41V, 41W: common mode choke coil, 42U, 42V, 42W: capacitor, 50: AC power source, 51U, 51V, 51W: power line, 50A: DC power source, 51AP, 51AN: power line, 60: motor, 61: motor body, 62: encoder circuit, 90: display unit

The invention claimed is:

1. A power conversion device comprising:
a power conversion circuit to convert power input to a power input terminal into AC power to be supplied to a motor, and to output the converted AC power to be supplied to the motor, to a power output terminal to which an electric cable of a power cable used for supplying AC power to the motor is connected;
a ground terminal to which a ground line of the power cable is connected;
an encoder circuit to output encoder information, on a basis of angle information input to an information input terminal and supplied from a signal line of a signal transmission cable;
a control circuit to output a control signal that controls the power conversion circuit on a basis of the encoder information supplied from the encoder circuit;
a shield terminal to which a shield of the signal transmission cable is connected, the shield being electrically connected to the ground line of the power cable on a side of the motor; and
determination circuitry to detect a current input to the shield terminal and flowing through the shield of the signal transmission cable, and to output disconnection detection information for disconnection in the shield of the signal transmission cable.

2. The power conversion device according to claim 1, wherein the power input to the power input terminal is DC power.

3. The power conversion device according to claim 1, wherein the power input to the power input terminal is AC power.

4. The power conversion device according to claim 3, wherein
the power conversion circuit includes:
a rectifier circuit having an input end connected to the power input terminal and an output end, to convert an AC voltage of input AC power into a DC voltage of DC power and to output the DC voltage of the DC power to the output end; and
an inverter circuit having an input end connected to the output end of the rectifier circuit and an output end, to convert the DC power into AC power of an AC voltage on a basis of the input DC voltage and to output the AC power to the output end, the output end being connected to the power output terminal, and
the determination circuitry includes:
current detection circuitry to detect a current flowing through a ground line connected to the shield terminal; and
comparison circuitry to compare the current detected by the current detection circuitry with a set value and to output disconnection detection information for disconnection of the shield of the signal transmission cable on a basis of the comparison result.

5. The power conversion device according to claim 4, further comprising a capacitor connected between each of a pair of buses connecting the rectifier circuit and the inverter circuit to each other and a ground node.

6. A motor drive system comprising:
a power cable including an electric cable to transmit AC power to be supplied to a motor and a ground line;
a signal transmission cable including a signal line to transmit angle information of a rotation shaft of the motor and a shield electrically connected to the ground line of the power cable on a side of the motor; and
a power conversion device including: a power conversion circuit to convert power supplied from a power source into the AC power to be supplied to the motor and to supply the AC power to be supplied to the motor to the electric cable of the power cable; a ground terminal to which the ground line of the power cable is connected; an encoder circuit to output encoder information on a basis of the angle information supplied from the signal line of the signal transmission cable; a control circuit to output a control signal that controls the power conversion circuit on a basis of the encoder information supplied from the encoder circuit; and determination circuitry to detect a current flowing through the shield of the signal transmission cable and to output disconnection detection information for disconnection of the shield of the signal transmission cable.

7. The motor drive system according to claim 6, wherein
the power conversion circuit includes an inverter circuit having an input end connected to a power input terminal to which the power supplied from the power source is input and an output end, to convert the power into an AC voltage of the AC power on a basis of input voltage of the power source and to output the AC power to the output end, the output end being connected to a power output terminal to which the electric cable of the power cable is connected, and
the determination circuitry includes: current detection circuitry to detect a current flowing through a ground line connected to a shield terminal to which the shield of the signal transmission cable is connected; and comparison circuitry to compare the current detected by the current detection circuitry with a set value and to output disconnection detection information for disconnection of the shield of the signal transmission cable on a basis of the comparison result.

8. The motor drive system according to claim 6, wherein the power input to the power input terminal is AC power, and
the power conversion circuit includes:
a rectifier circuit having an input end connected to the power input terminal and an output end, to convert an AC voltage of input AC power into a DC voltage of DC power and to output the DC voltage of the DC power to the output end; and
an inverter circuit having an input end connected to the output end of the rectifier circuit and an output end, to convert the DC power into AC power of an AC voltage on a basis of the input DC voltage and to output the AC power to the output end, the output end being connected to the power output terminal, and
the determination circuitry includes:
current detection circuitry to detect a current flowing through a ground line connected to the shield terminal to which the shield of the signal transmission cable is connected; and
comparison circuitry to compare the current detected by the current detection circuitry with a set value and to output disconnection detection information for disconnection of the shield of the signal transmission cable on a basis of the comparison result.

9. The motor drive system according to claim 8, further comprising a capacitor connected between each of a pair of buses connecting the rectifier circuit and the inverter circuit to each other and a ground node.

10. The motor drive system according to claim 6, wherein a noise filter including a common mode choke coil and a capacitor is connected between the power conversion device and the power source.

11. The motor drive system according to claim 6, wherein the power cable and the signal transmission cable are coated with a common insulating coating.

12. A disconnection detection method for a signal transmission cable, the method comprising:
   detecting a current flowing through a shield of a signal transmission cable including a signal line that transmits angle information of a rotation shaft of a motor and the shield electrically connected, on a side of the motor, to a ground line of a power cable that transmits AC power to be supplied to the motor; and
   comparing the detected current flowing through the shield with a set value, and performing disconnection detection of the shield of the signal transmission cable on a basis of the comparison result.

13. The disconnection detection method according to claim 12, the method further comprising:
   detecting a current flowing through the shield of the signal transmission cable including: the signal line; and the shield electrically connected to the ground line of the power cable that transmits three-phase AC power to be supplied to the motor from a power conversion circuit, the current flowing through the shield when, in the power conversion circuit, upper arms for three phases are all turned on and lower arms for three phases are all turned off or when the upper arms for three phases are all turned off and the lower arms for three phases are all turned on, and setting the detected current value as the set value.

* * * * *